(12) United States Patent
Delarochelliere et al.

(10) Patent No.: US 10,499,308 B2
(45) Date of Patent: Dec. 3, 2019

(54) SYSTEM FOR TRANSMITTING DATA FROM AN UNDERGROUND VEHICLE

(71) Applicant: NEWTRAX HOLDINGS INC., Montreal, Quebec (CA)

(72) Inventors: Jacques Delarochelliere, St-Bruno (CA); David Brillon, La Prairie (CA); Jean-Sebastien Bouchard, Montreal (CA)

(73) Assignee: Newtrax Holdings Inc., Montreal, Quebec (CA)

( * ) Notice: Subject to any disclaimer, the term of this patent is extended or adjusted under 35 U.S.C. 154(b) by 0 days.

(21) Appl. No.: 15/742,755

(22) PCT Filed: Jul. 6, 2016

(86) PCT No.: PCT/CA2016/050785
§ 371 (c)(1),
(2) Date: Jan. 8, 2018

(87) PCT Pub. No.: WO2017/004713
PCT Pub. Date: Jan. 12, 2017

(65) Prior Publication Data
US 2018/0206175 A1     Jul. 19, 2018

Related U.S. Application Data

(60) Provisional application No. 62/188,843, filed on Jul. 6, 2015.

(51) Int. Cl.
*H04W 40/22* (2009.01)
*E21F 17/00* (2006.01)
(Continued)

(52) U.S. Cl.
CPC ............. *H04W 40/22* (2013.01); *E21F 17/00* (2013.01); *E21F 17/18* (2013.01);
(Continued)

(58) Field of Classification Search
CPC ..... H04W 40/22; H04W 28/04; H04W 84/18; H04W 88/04; E21F 17/00; E21F 17/18;
(Continued)

(56) References Cited

U.S. PATENT DOCUMENTS

2005/0002354 A1* 1/2005 Kelly ................. H04L 45/04
370/329
2011/0251752 A1* 10/2011 DeLarocheliere ..... G07C 5/008
701/31.4

(Continued)

*Primary Examiner* — Wutchung Chu
(74) *Attorney, Agent, or Firm* — Brouillette Legal

(57) ABSTRACT

There is described a system for sending, via a communication network, data originating from a monitoring of equipment in a network-inaccessible location. The system comprises a first interface device to be operated in a network-inaccessible location and comprising: sensors for monitoring a first equipment; a processor connected to the sensors for generating a data packet from the monitoring; and a local input/output (I/O) device for sending the data packet. The system further comprises a second interface device, to be displaced from the network-inaccessible location to a network-accessible location, comprising a local I/O device for receiving the data packet from the first interface device; and a network-connected I/O device to deliver the data packet via the communication network.

5 Claims, 10 Drawing Sheets

(51) Int. Cl.
    *H04Q 9/00* (2006.01)
    *H04L 29/08* (2006.01)
    *H04Q 9/02* (2006.01)
    *H04W 28/04* (2009.01)
    *E21F 17/18* (2006.01)
    *H04W 84/18* (2009.01)
    *H04W 88/04* (2009.01)

(52) U.S. Cl.
    CPC ............ *H04L 67/1095* (2013.01); *H04Q 9/00* (2013.01); *H04Q 9/02* (2013.01); *H04W 28/04* (2013.01); *H04Q 2209/40* (2013.01); *H04Q 2209/82* (2013.01); *H04W 84/18* (2013.01); *H04W 88/04* (2013.01)

(58) Field of Classification Search
    CPC ........ H04L 67/1095; H04Q 9/00; H04Q 9/02; H04Q 2209/40; H04Q 2209/82
    See application file for complete search history.

(56) References Cited

U.S. PATENT DOCUMENTS

| | | | |
|---|---|---|---|
| 2012/0011365 A1* | 1/2012 | Schmidt | G01D 21/00 713/168 |
| 2016/0057004 A1* | 2/2016 | Ge | H04W 4/70 370/254 |
| 2017/0280351 A1* | 9/2017 | Skaaksrud | H04L 67/303 |
| 2017/0372534 A1* | 12/2017 | Steketee | G06Q 10/087 |

* cited by examiner

SYSTEM FOR TRANSMITTING DATA FROM AN UNDERGROUND VEHICLE

CROSS-REFERENCE TO RELATED APPLICATIONS

This application claims priority from U.S. provisional patent application 62/188,843, filed on Jul. 6, 2015.

BACKGROUND

(a) Field

The subject matter disclosed generally relates to systems for transmitting data from network-inaccessible equipment. In a specific example, it relates to systems for transmitting data from vehicles in a mine.

(b) Related Prior Art

Various vehicles, notably trucks and other large or commercial vehicles, can have various sensors installed thereon for accumulating data about the state of the vehicle. For example, speed, acceleration, braking, tire pressure, fuel consumption rate, oil level and other parameters can be monitored constantly. This large flow of data can be stored in an embarked system and delivered via a network, either remote internet connections (LTE, 3G, etc.) or local connections (such as WiFi). Such a system is described in patent publication U.S. 2011/0251752 A1, incorporated herein by reference.

A notable difficulty encountered by such systems is the monitoring of underground vehicles such as mining vehicles and drilling moles. A priori, there is no internet network (or any equivalent thereof) in the mine. Moreover, many of the vehicles stay underground, or at least do not go out on a regular basis. If data transmission cannot take place, data can only be recorded, or eventually deleted locally (i.e., in the vehicle) and never used.

There have been some attempts to address this problem. For example, in Bandyopadhyay et al. ("Wireless information and safety system for mines", *J. Sci. & Ind. Research*, Vol. 68, February 2009, pp. 107-117), there is described a system comprising a plurality of routers installed in the mine tunnels. However, if a link is broken between routers (if one of the routers fails for any reason), the information originating from the most remote places in the mine are never communicated and are lost. Redundant routers can be installed to circumvent the problem, increasing the cost of the overall network.

Routers can be installed directly on vehicles and people, as proposed in U.S. Pat. No. 8,816,850. However, the solution described therein uses ZigBee and therefore is adapted for small data flows only. Moreover, reliability is suboptimal since information can be lost if a router is damaged or loses power.

SUMMARY

According to an aspect of the invention, there is provided a system for sending, via a communication network, data originating from a monitoring of equipment in a network-inaccessible location. The system comprises a first interface device to be operated in a network-inaccessible location and comprising: sensors for monitoring a first equipment; a processor connected to the sensors for generating a data packet from the monitoring; and a local input/output (I/O) device for sending the data packet. The system further comprises a second interface device, to be displaced from the network-inaccessible location to a network-accessible location, comprising: a local I/O device for receiving the data packet from the first interface device; and a network-connected I/O device to deliver the data packet via the communication network.

According to an embodiment, the network-connected I/O device is further to receive, via the communication network, a receipt signal indicating the data packet that was delivered.

According to an embodiment, the local I/O device of the second interface device is further for sending the receipt signal for eventual reception by the first interface device.

According to an embodiment, the second interface device further comprises sensors for monitoring a second equipment and a processor connected to the sensors of the second interface device for generating data packets another data packet from the monitoring.

According to an embodiment, the network-connected I/O device of the second interface device is further adapted to deliver the data packets from both the first interface device and the second interface device and to receive the receipt signal indicating the data packets that were delivered.

According to an embodiment, the first interface device and the second interface device are to be installed on first mining equipment and second mining equipment, respectively.

According to an embodiment, the sensors of the first interface device and of the second interface device have connectors for connection to a communication bus of the first mining equipment and of the second mining equipment, respectively.

According to an embodiment, there is further provided a third interface device to be operated in a network-inaccessible location and comprising: a local I/O device for receiving at least one the data packet from the first interface device or from the second interface device upon establishing a local communication with the first interface device or the second interface device, for storing the data packet, and for retransmitting the at least one data packet to the other one of the first interface device or the second interface device upon establishing a local communication therewith.

According to an embodiment, the third interface device further comprises: sensors for monitoring a third equipment; a processor connected to the sensors for generating a data packet from the monitoring; and the local I/O device being further for sending the data packet from the third interface device upon establishing a local communication with the first interface device or the second interface device.

According to another aspect of the invention, there is provided a system for sending, via a communication network, data originating from a monitoring of equipment in a network-inaccessible location, the system comprising: a first interface device for monitoring a first equipment and generating a data packet from the monitoring; and a second interface device for monitoring a second equipment and generating a data packet from the monitoring, wherein: the first interface device and the second interface device are adapted for mutual communication through which the first interface device and the second interface device synchronize the data packets recorded thereon; at least one of the first interface device and the second interface device is adapted: to be displaced to a network-accessible location; to deliver, via the communication network, the data packets recorded thereon; to receive, via the communication network, a receipt signal indicating the data packets that were delivered; and the interface device which received the receipt signal is adapted to communicate the receipt signal to the other interface device.

According to an embodiment, there is further provided at least one other interface device adapted for mutual communication with both the first interface device and the second interface device for synchronizing the data packets recorded thereon.

According to an embodiment, upon receiving the receipt signal from one of the interface devices, any interface device synchronizes the data packets recorded thereon with this one of the interface devices except the data packets identified in the receipt signal.

According to an aspect of the invention, there is provided a method for transmitting data originating from a network-inaccessible location to a processing center. The method comprises: monitoring equipment by a first interface device in a network-inaccessible location; generating an identifiable data packet from the monitoring; providing a local communication between the first interface device and a second interface device; sending the identifiable data packet from the first interface device to the second interface device for recording thereon; displacing the second interface device to a network-accessible location for sending the identifiable data packet to a processing center.

According to an embodiment, the second interface device has at least another identifiable data packet recorded thereon, further comprising, upon providing the local communication between the first interface device and the second interface device, sending the other identifiable data packet from the second interface device to the first interface device for recording thereon, thereby synchronizing the identifiable data packets recorded on the first interface device and the second interface device.

According to an embodiment, there is further provided, upon sending the identifiable data packet to a processing center, receiving a receipt signal of any identifiable data packet received by the processing center.

According to an embodiment, there is further provided, upon providing the local communication between the first interface device and the second interface device, sending the receipt signal from the second interface device to the first interface device.

According to an embodiment, synchronizing the identifiable data packets comprises excluding from the synchronizing the identifiable data packets which are identified in the receipt signal as received by at least one of the first and the second interface devices.

According to an embodiment, providing a local communication between the first and second interface devices comprises: providing a local communication between the first interface device and a third interface device; sending the identifiable data packet from the first interface device to the third interface device; providing a local communication between the third interface device and the second interface device; and sending the identifiable data packet from the third interface device to the second interface device.

According to an embodiment, the third interface device comprises one or more interface devices, wherein if the third interface device comprises two or more interface devices, a local communication is provided at least temporarily between two of them.

According to an embodiment, upon providing the local communication between the first interface device and the third interface device, the third interface device sends any identifiable data packet recorded thereon to the first interface device; and wherein upon providing the local communication between the third interface device and the second interface device, the second interface device sends any identifiable data packet recorded thereon to the third interface device.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

The system for transmitting data from vehicles described above in reference to patent publication U.S. 2011/0251752 A1 requires transmission of large amounts of data. There is thus a need for a system capable of transmitting a large flow of data from underground vehicles. There is further a need for transmitting such data with high reliability.

In embodiments there are disclosed a system 1000 and a method for transmitting data from equipment in a network-inaccessible location (e.g., underground equipment) to the network (e.g., at the ground surface).

Figure 1:
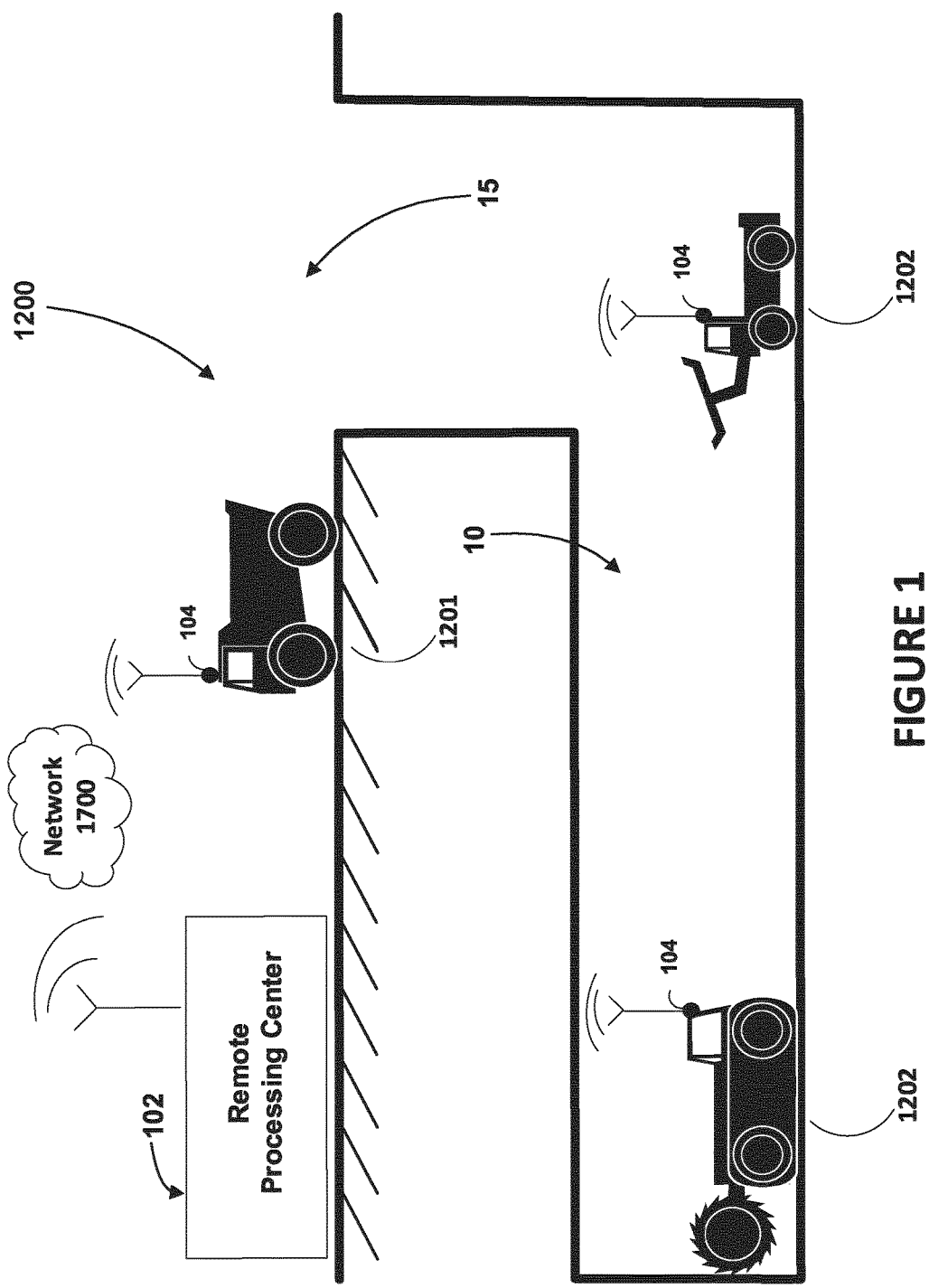
FIG. 1 is a diagram illustrating a system installed on a plurality of vehicles for transmitting data, according to an embodiment.

In reference with FIG. 1, the system 1000 is to be used in an underground location 10 or any other network-inaccessible location. The underground location 10 is a mine, tunnel, hole, cave, well or bore, or other network-inaccessible location. The underground location 10 is located under or close to a surface location 15 which is network-accessible. Therefore, when proper equipment (i.e., a transmitter) is located at the surface location 15, transmission of data 1500 to appropriate hardware (e.g. remote processing center 102) via a communication network 1700 is possible, whereas it was impossible in the underground location 10 due to the absence of a network to transmit the data 1500. The communication network 1700 may include internet network, cellular phone network, radio network, or any other network that allows remote transmission of data.

At the underground location 10, there are vehicles, also known as equipment 1200. The vehicles or equipment 1200 comprise a vehicle or an equipment which repetitively (e.g. once an hour, once a day) returns to the surface location 15, namely surface-returning equipment 1201. The remainder of the vehicles or equipment 1200 comprises vehicles or equipment which stay at the underground location 10 always or during long periods (e.g., several days or longer), namely principally-underground equipment 1202. FIG. 1 shows surface-returning equipment 1201 at the surface location 15 where it can communicate remotely, and principally-underground equipment 1202 at the underground location 10 where it is isolated from the communication network 1700.

For example, the equipment 1200 comprises at least one of: a truck, haul truck, drilling mole, minecart, mine car, mantrip, conveyor, mechanical shovel or excavator, or any other type of mining truck or driven equipment that can go underground.

This way of doing things (having equipment staying mostly underground and vehicles which go up to the surface and down into the mine) is currently used in the mining industry. Therefore, the system 1000 for transmitting data 1500 described herein is to be easily implemented in the existing workflow of the mining industry.

Other applications can also be contemplated, for example in forestry. The most remote locations where tree-cutting vehicles and tree-loading vehicles go can be network-inaccessible locations, while less remote places where wood is stocked and transformed are network-accessible location. The vehicles used in this industry can also be advantageously monitored with dedicated devices installed thereon. Even though there is no displacement from underground to the surface, these vehicles and how they operate are analogous to the observed pattern in the mining industry, with vehicles that stay during long periods in network-inaccessible locations and other vehicles that repeatedly transit from network-inaccessible locations to network-accessible locations.

The system 1000 comprises a plurality of telemetry interface devices 104. Each one of the vehicles or equipment 1200 for which data 1500 is to be communicated comprises one (or at least one) of the telemetry interface devices 104. The telemetry interface devices 104 are for communicating with a remote processing center 102 via the communication network 1700. According to an embodiment, the telemetry interface device 104 of the surface-returning equipment 1201 is for communicating directly with a remote processing center 102, while the telemetry interface devices 104 of the underground-only equipment 1202 are for communicating indirectly with a remote processing center 102 via the telemetry interface device 104 of the surface-returning equipment 1201, as detailed further below in reference with FIGS. 3A-3F and FIG. 4.

Figure 2A:
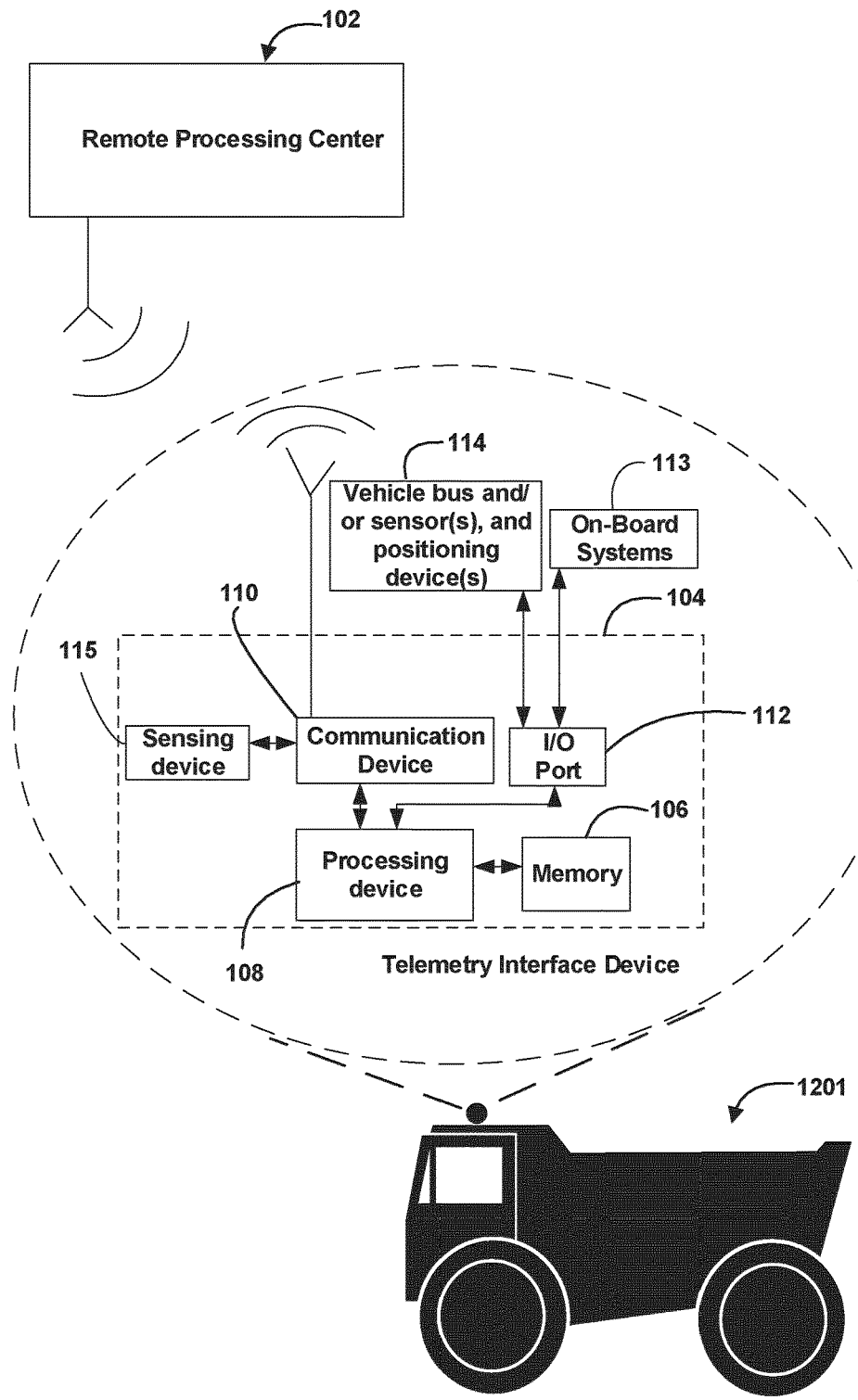
FIGS. 2A-2B are diagrams illustrating a telemetry interface device adapted for communication with a remote processing center, according to an embodiment.

Now referring to FIG. 2A, each telemetry interface device 104 is installed in the equipment 1200, in operative communication with a vehicle data bus and/or sensor(s) and positioning device(s) already on board the equipment 1200 (represented as element 114) and/or on-board systems such as a driller, a bin or an excavator arm, for example.

The telemetry interface device 104 comprises a memory device 106, a processing device 108 in communication with the memory device 106, and a communication device 110.

The Input/Output (I/O) port 112 allows for connectivity of the telemetry interface device 104 with at least one of a vehicle bus, an onboard sensor(s) and/or an optional positioning device; illustrated as element 114 and/or other onboard systems. I/O port 112 is any data connection port allowing uni- or bi-directional communication of data with the telemetry interface device 104.

In accordance with the specifics of each vehicle, the onboard sensor(s) and/or positioning device(s), as illustrated by element 114, are either in operative communication with the telemetry interface device 104 via the vehicle data bus, or directly in communication with the telemetry interface device 104.

The telemetry interface device 104 also has an optional sensing device(s) 115 usable to replace or supplement onboard sensor(s) and/or positioning device(s) for example. Such sensing device(s) 115 can be any sensing element such as an accelerometer for measuring the overall vehicle's acceleration (i.e., as a unit body) which is usable to monitor vehicle turns and breakings, or embarked tool (driller, shovel, mechanical arm, etc.) manipulation, to determine any aggressive driving manoeuvres, for example. The telemetry interface device 104 may also be fitted with a Global Positioning System (GPS) receiver (not shown) for monitoring the position of the equipment 1200 when it is at the surface location 15 (however, receptivity of GPS signals and internet signals may differ).

Still in reference to FIG. 2A, the memory device 106 accumulates measured equipment parameters repeatedly (e.g., periodically) and in a substantially uninterrupted manner over a given period. Measured equipment parameters refer to any vehicle parameter measurements being monitored from onboard the vehicle. Such measured equipment parameters is indicative of any variations occurring in the monitored equipment parameters during such given monitoring period. The given period is over a substantially continuous time, generally during equipment operation time.

The processing device 108 is implemented to receive sensor data from at least one of the onboard sensor(s) and/or positioning device(s), as well as from the vehicle bus 114 and the sensing device(s) 115, during the given period. Once received such sensor data is recorded by the processing device 108 as measured equipment parameters, on the memory device 106. The recording can take place during the given period, as soon as the sensor data is being sensed and received. The measured equipment parameters are recorded at a sampling frequency (also referred to herein as a rate) which allows taking measurements of an instantaneous value from the recorded measured equipment parameters. The data is recorded onboard, on the memory device 106. As long as the equipment 1200 being monitored is isolated from the communication network 1700 and from other equipment, such data accumulate on the memory device 106.

The definition of an instantaneous value depends on a series of factors which are defined by the type of application in which the system is involved. Types of applications include for example Fleet Management, Durability Testing/Mission Profiling, and Prototype and Engineering Testing. In a Fleet Management application, 10 to 10,000 vehicles would be involved, 1 to 10 parameters are being monitored and the sampling rates vary from 0.1 to 1 samples/second. In a Durability Testing/Mission Profiling application, 10 to 100 vehicles would be involved, 1 to 100 parameters are being monitored and the sampling rates vary from 1 to 1,000 samples/second. In a Prototype and Engineering Testing application, 1 to 10 vehicles would be involved, 10 to 1,000 parameters are being monitored and the sampling rates vary from 100 to 1,000,000 samples/second. Since data are sampled at a high rate and accumulate on the memory device 106, the amount of data to be transmitted, when transmission conditions are met, is very high and requires corresponding hardware. For example, ZigBee systems are insufficient to transmit such a high amount of data, since they run on long-life batteries and transmit only low data flows. The system 1000 uses a plurality of telemetry interface devices 104 which run on the equipment's own source of energy (usually fuel which is burnt and converted to electrical power). They are thus adapted to send high data flows without being bothered by the corresponding high energy consumption.

Once the measured equipment parameters are recorded, and if the surface-returning equipment 1201 is at the surface location 15, the communication device 110 transmits the recorded data 1500 via the communication network 1700 to the remote processing center 102, as shown in FIG. 1.

Figure 2B:
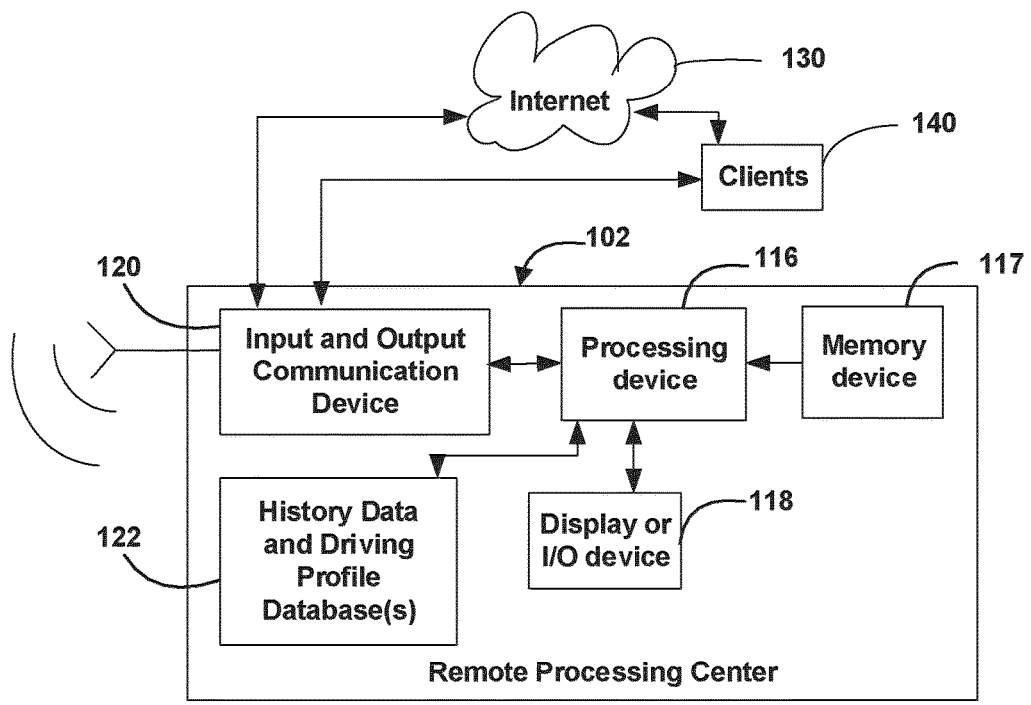
Figure 2B:
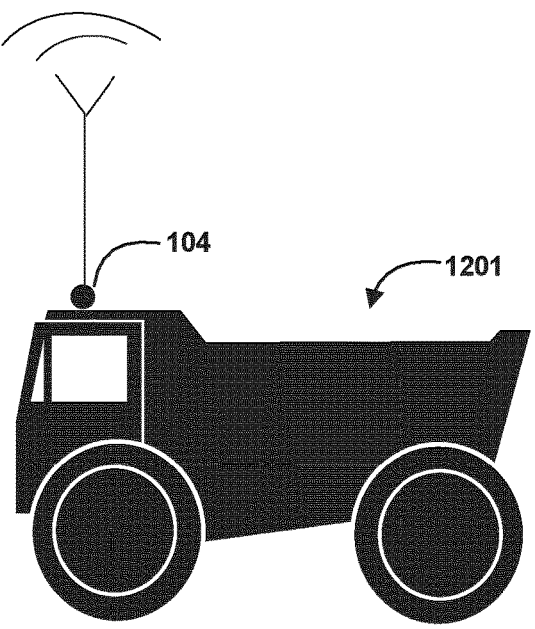

Now referring to FIG. 2B, the remote processing center 102 comprises a processor 116 with internal and/or external memory (not shown); a display device or any other user input/output (I/O) device 118 (e.g., a printer port); and database(s) 122. The communication device 120 ensures reception of the measured equipment parameters transmitted from the telemetry interface device 104. In an embodiment such as the one illustrated, the transmission is wireless. The remote processing center 102 and the telemetry interface device 104 can communicate with each other over a network such as a cellular phone network or a local 900 MHz communication, for example, installed at select network-accessible locations.

The processor 116 is implemented using instructions stored in its internal and/or external memory 117. Coded instructions permit the processor 116 to receive the measured equipment parameters from the telemetry interface device 104. Once the data 1500 is received, the processor 116 identifies driving manoeuvres/criteria from the measured equipment parameters; the driving manoeuvres identified thus occurred during the given period over which the measured equipment parameters was accumulated. When the data can be analysed in real-time during its accumulation on board the vehicle, then the driving manoeuvres are actually occurring as they are being identified and later evaluated.

According to an embodiment, the identification of the driving manoeuvres/criteria is performed by analysing variations in the measured equipment parameters pertaining to equipment parameters for example. Each one of the driving manoeuvres is characterized by a quantitative value, while at least one of the driving manoeuvres identified is characterized by an instantaneous value as measured from the measured equipment parameters.

Non-exhaustive examples of quantitative values associated with a driving manoeuvre include: a time elapsed, a distance traveled, and a vehicle speed as taken from a speed of the wheels. Non-exhaustive examples of instantaneous values associated with a driving manoeuvre include: a fuel flow rate, a rotations/revolutions per minute (RPM) of the motor, a turbo pressure, an engine throttle value, and vehicle acceleration such as that measured from an internal acceleration device and which is indicative of hard turns or braking as well as up-hill or down-hill routes for example. Brutal manoeuvres of the mining equipment (e.g., driller, excavating arm, mechanical shovel, wheels of the vehicle) can also be monitored and recorded for an eventual evaluation at the remote processing center 102 by comparing, for example, the measured values with acceptable ranges of values.

The state of the equipment, for example the tire pressure or structural integrity of an important equipment part, can also be monitored for preventing failure of the equipment before the equipment is too degraded to be used. Indeed, avoiding equipment failure inside a mine is critical since space is limited. The mine's operation can be interrupted if a large-size equipment fails at a critical location in the mine, thereby obstructing the passageway. Forecasting an eventual failure can help reducing undesirable delays, and monitoring the state of the equipment, and/or the behavior of those who drive the equipment, can aid in estimating how fast equipment is being degraded.

The processor 116 is also implemented to evaluate at least one of the driving manoeuvres/criteria identified as being satisfactory or unsatisfactory. A comparison of each one of the driving manoeuvres identified with a threshold (or target) according to which a satisfactory driving becomes unsatisfactory is performed. The comparison involves detecting either conformity or deviation from the threshold or a set of threshold values, or from an acceptable range.

Thresholds, criteria and behavior report generation are discussed in patent publication U.S. 2011/0251752 A1, incorporated herein by reference.

The content of the remote processing center 102 (e.g. the driving reports) is accessible by clients 140 through the internet 130 or directly (e.g., on a local network or any other form of direct communication) through input and output communication device 120.

The remote processing center 102 comprises a computer system, or server, including a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware.

The system 1000 illustrated in FIG. 1 is adaptable for use with a fleet of vehicles, wherein each vehicle is installed with at least one telemetry interface device 104, as mentioned above. In such an embodiment, the remote processing center 102 receives measured equipment parameters, or data 1500, originating from all the vehicle telemetry interface devices 104 of each one of the multiple vehicles and received via the telemetry interface device 104 of the surface-returning equipment 1201.

The data 1500 is sub-divided in data packets 1501 corresponding to a telemetry interface device 104. Identification numbers are attributed to each data packet 1501 to distinguish data 1500 originating from each vehicle. The remote processing center 102 then proceeds to generate driving profiles in association with corresponding vehicles and/or drivers.

Referring now to FIGS. 3A-3F, there is shown how the system 1000 is adapted to transmit massive data 1500 originating from a plurality of equipment 1200 located underground in a reliable way.

Figure 3A:
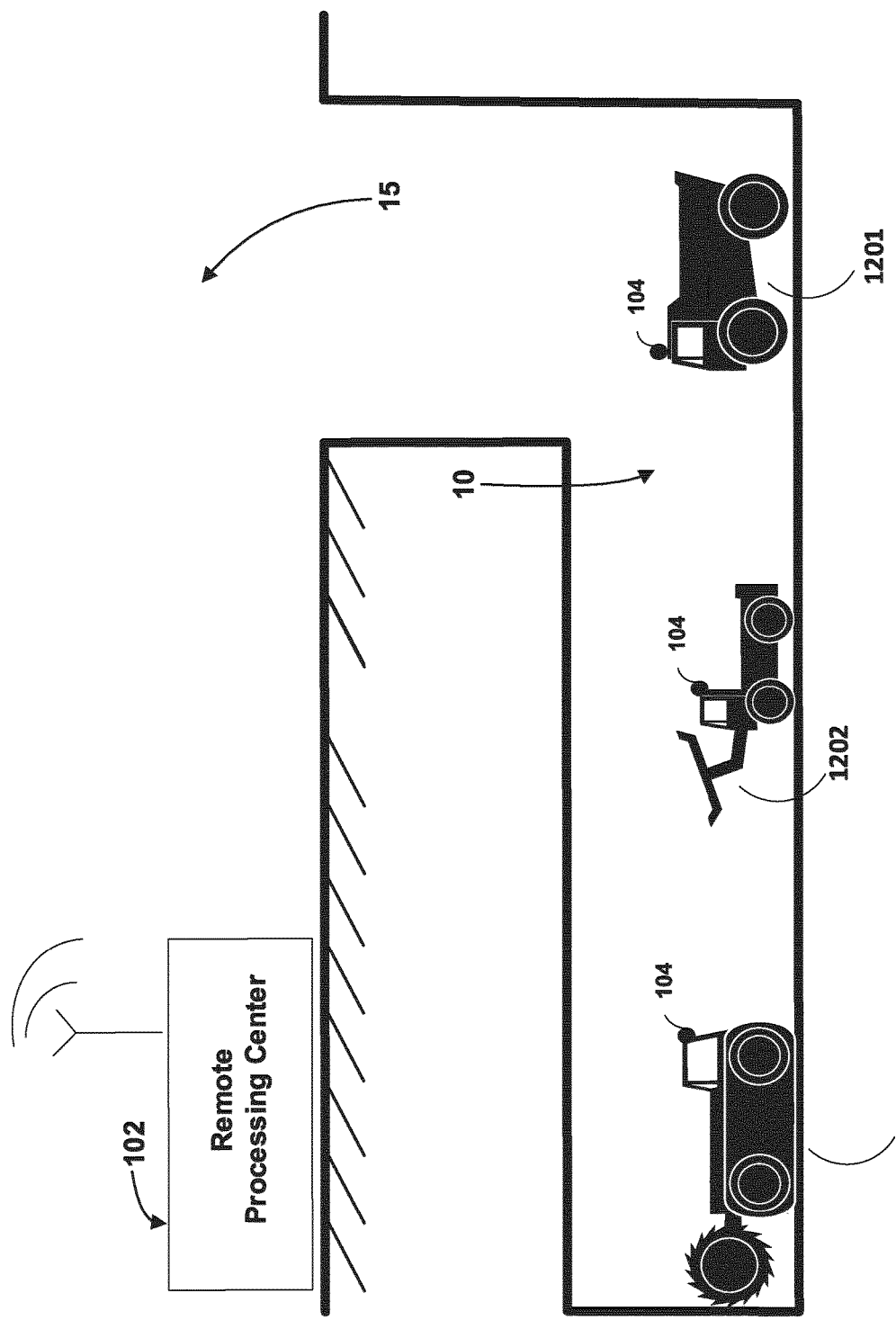
FIGS. 3A-3F are diagrams illustrating a system installed on a plurality of vehicles for transmitting data during various steps of the transmitting process, according to an embodiment.

FIG. 3A shows a plurality of equipment 1200 located at the underground location 10. Each one of them accumulates data 1500 about their own state. By assuming that each one of them is far enough from the neighboring one of the plurality of equipment 1200, each one of them is isolated and cannot communicate any data.

After a significant amount of data is accumulated and recorded onboard, the data is grouped into a data packet 1501. A data packet 1501 is defined as an amount of data formatted to be sent. This formatting can be minimal, thus a data packet 1501, in its simplest form, can be an amount of data. The formatting can also be more complex: structured in a predefined format such as an electronic file or folder, encoded, encrypted, etc., with an identifier for the data packet 1501. Data packets 1501 can be generated after a given time period, or after a given data size is accumulated, or when communication between vehicles is made possible, or under any other conditions that do not alter the eventual capability to monitor the equipment 1200. Therefore, when communication is made possible between vehicles, as described below, there may be only one data packet 1501 available for transmission, more than one data packet 1501, or even no data packet 1501.

Figure 3B:
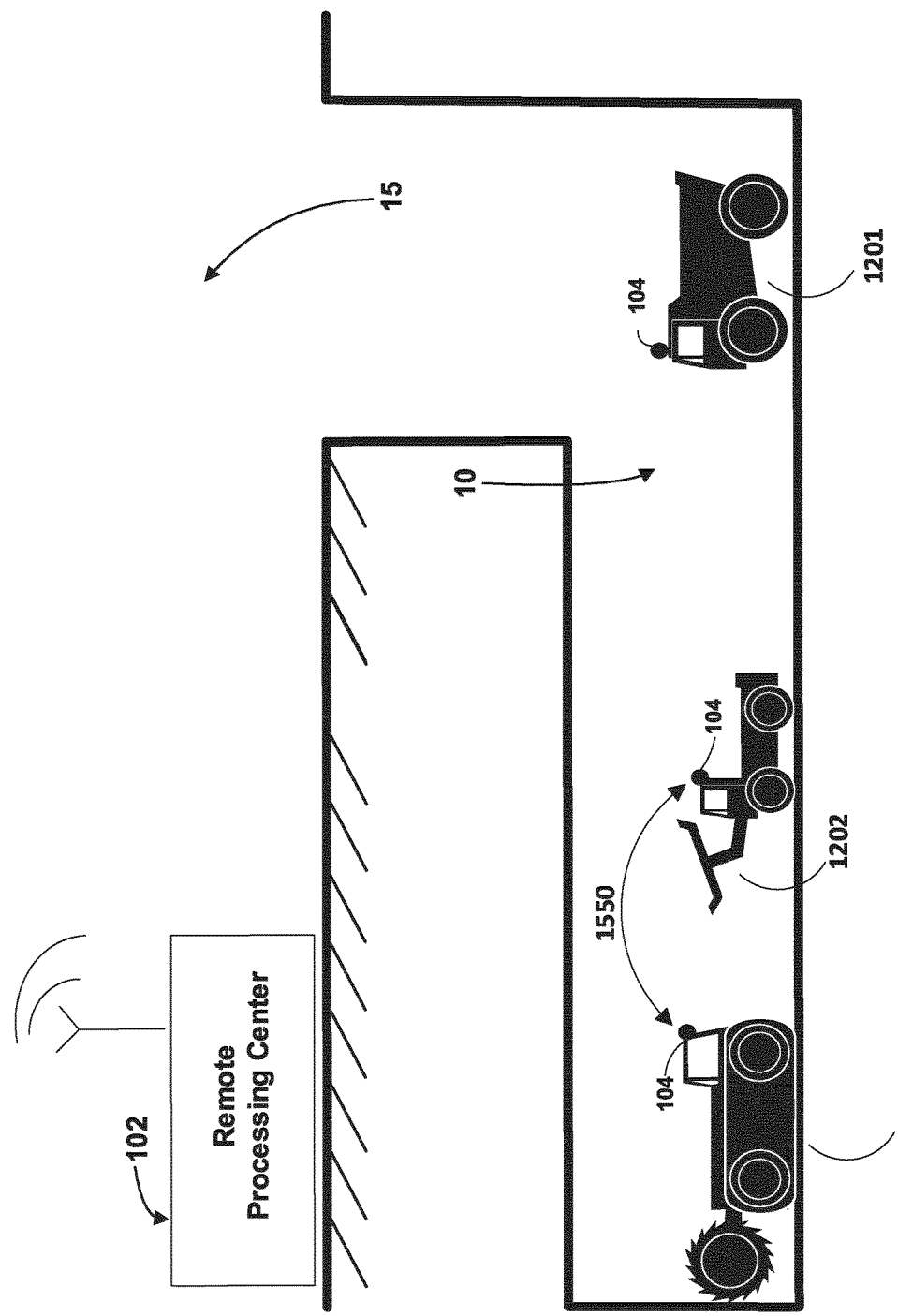

FIG. 3B shows a plurality of equipment 1200 located at the underground location 10, wherein two vehicles are close enough to be able to engage in a mutual communication. This mutual communication is illustrated with the data exchange communication 1550.

When two vehicles approach each other, the telemetry interface device 104 of one of them remotely detects the other one to engage in a mutual data exchange communication 1550, which comprises sent and received signals (e.g., electromagnetic or optical signals, audio/sound signals, visual signals and other types of suitable signals) between the telemetry interface device 104 of each part of equipment 1200 using their respective communication device 110.

According to an embodiment, the data exchange communication 1550 comprises verifying which data packets 1501 the other telemetry interface device 104 has in its memory device 106. Thereafter, each telemetry interface device 104 sends to the other telemetry interface device 104 the data packets 1501 that it has in its record and that the other one does not have. The data exchange communication 1550 therefore enables synchronization between the data packets 1501 stored on each telemetry interface device 104 of the equipment 1200 that met so that they have the same content (i.e., the same data 1500). This synchronization is facilitated by having the data packets 1501 identified by their identifier, which helps determining which data packet 1501 a telemetry interface device 104 has in its record and that the other one does not have.

The data exchange communication 1550 involves a local communication between at least two telemetry interface devices 104 which are close enough to allow this local communication to be provided. This local communication can be unidirectional, but is preferably mutual to allow synchronization between telemetry interface devices 104.

Figure 3C:
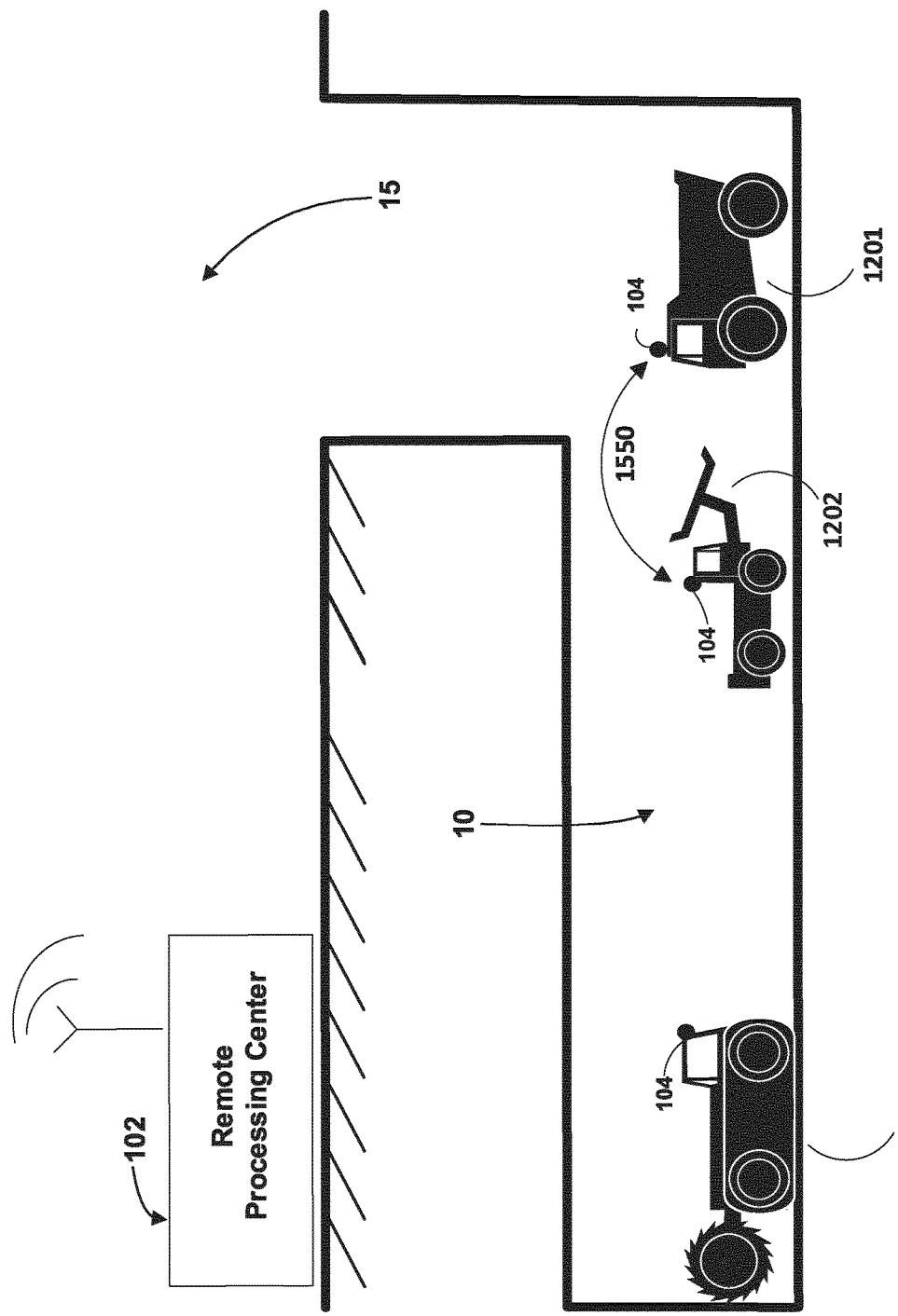

FIG. 3C illustrates another data exchange communication 1550 with another vehicle. It shows that synchronization of data 1500 stored on the memory device 106 of the telemetry interface device 104 of various pieces of equipment 1200 occurs in a chain. FIG. 3C further shows that data 1500 is now synchronized on the surface-returning equipment 1201.

Figure 3D:
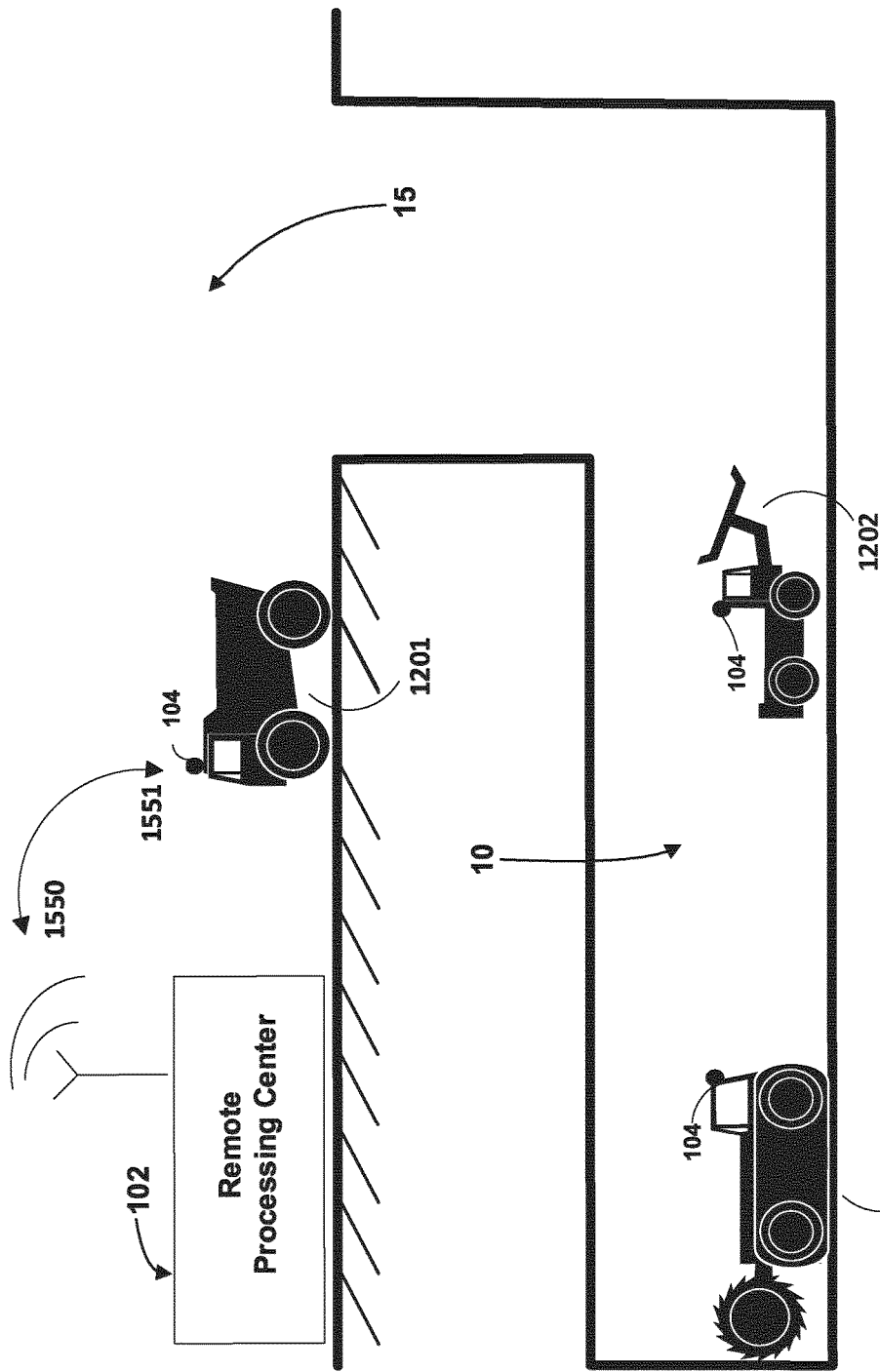

FIG. 3D shows the surface-returning equipment 1201 having moved up to the surface location 15. It illustrates the data exchange communication 1550 between the surface-returning equipment 1201 and the remote processing center 102 via the communication network 1700. Again, the data exchange communication 1550 involves synchronization of data 1500. All data packets 1501 accumulated by the telemetry interface device 104 of the surface-returning equipment 1201 are transmitted to the remote processing center 102 for eventual evaluation and report generation, among others.

This process involves a reliability issue, since the most remote equipment 1200 or simply the equipment staying at the underground location 10 does not possess information regarding the delivery of their data packets 1501.

According to an embodiment, there is provided a receipt signal 1551 to inform the equipment 1200 that their data packets 1501 were received by the remote processing center 102.

FIG. 3D shows a receipt signal 1551 sent by the remote processing center 102. The receipt signal 1551 comprises the identifier for each one of the data packets 1501 that were actually received by the remote processing center 102. The receipt signal 1551 of FIG. 3D is shown as being a signal which is a part of the data exchange communication 1550. However, in another embodiment, it can be sent independently at the start or after the end of the data exchange communication 1550.

Figure 3E:
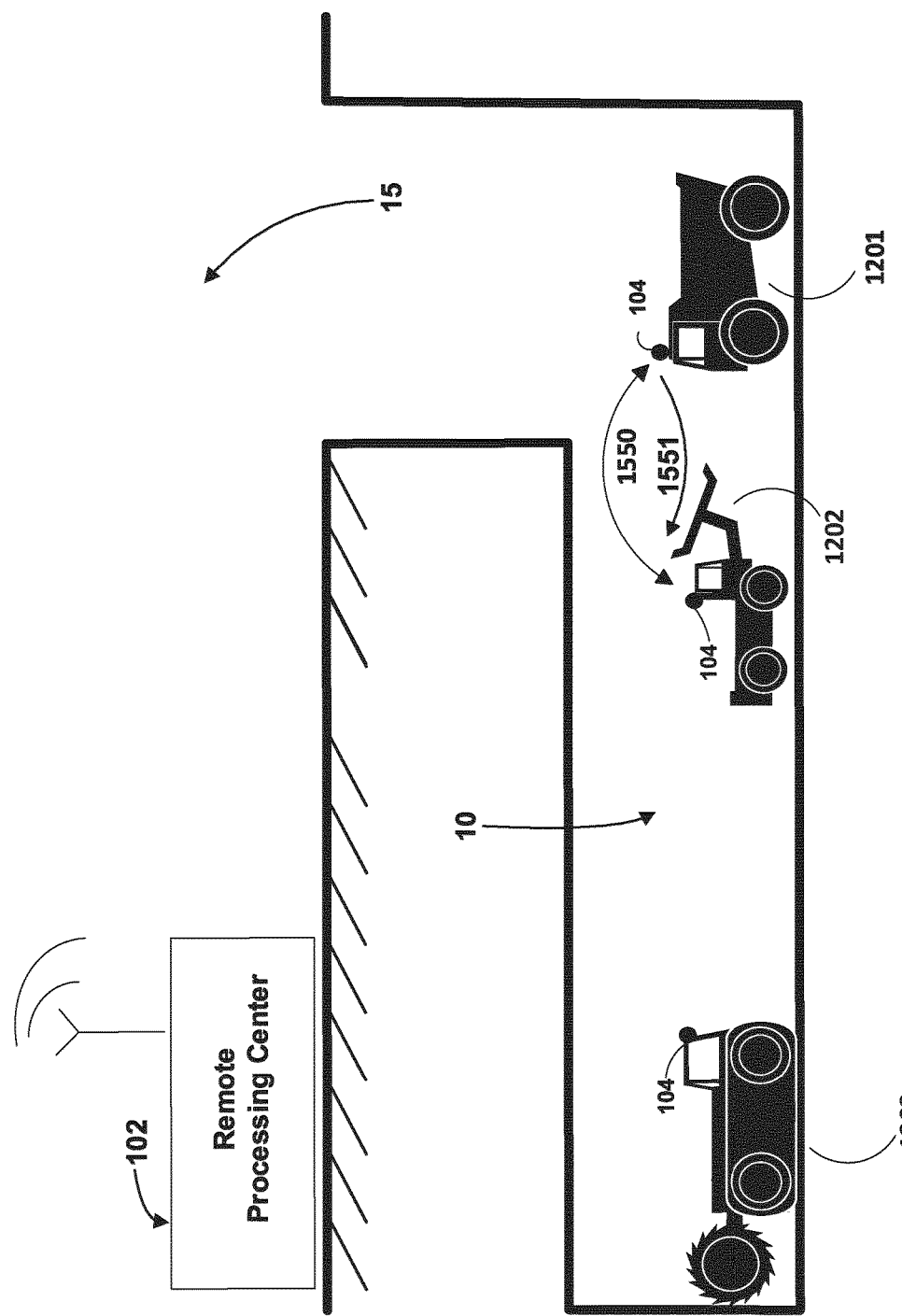
Figure 3F:
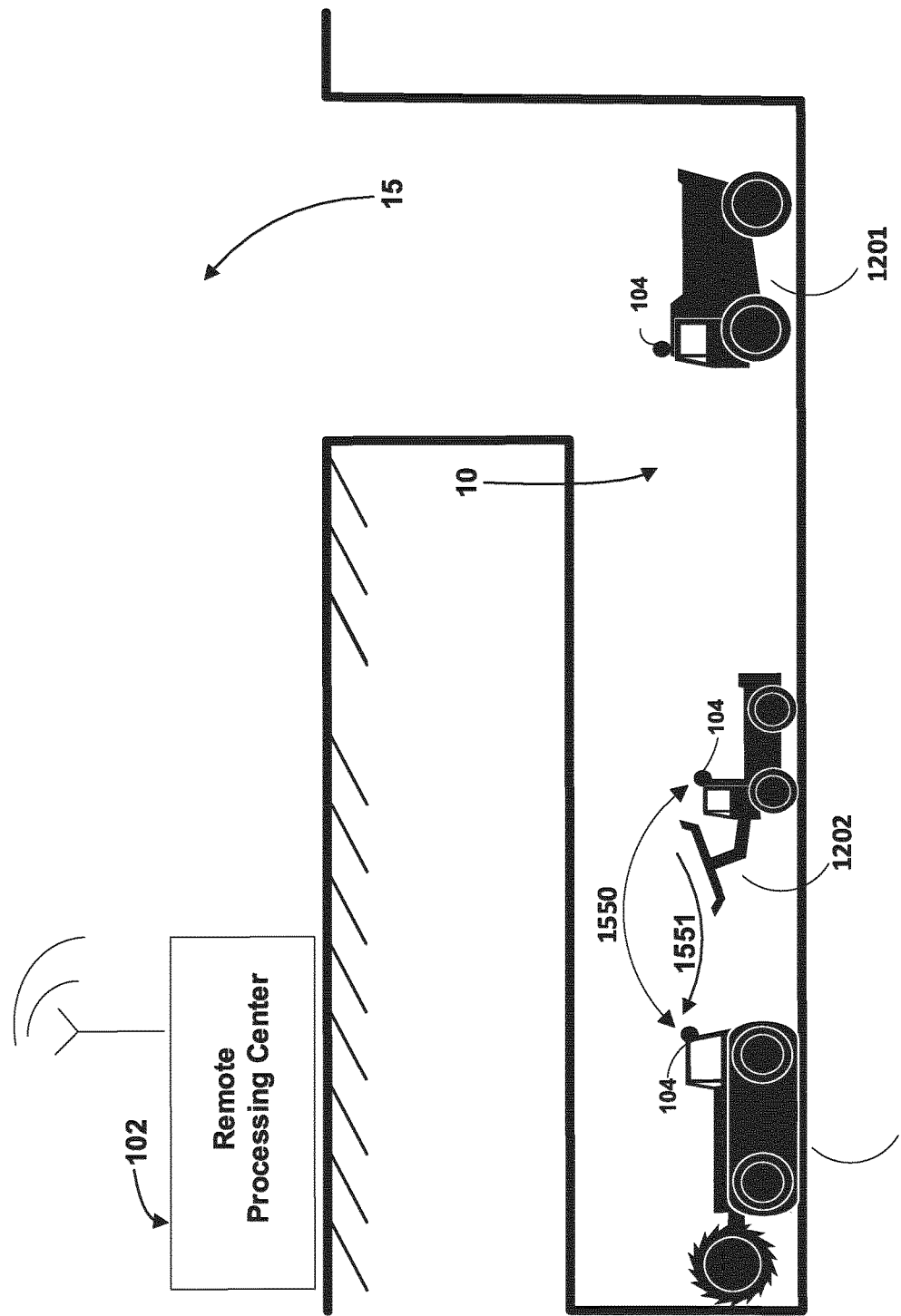

FIG. 3E and FIG. 3F show data exchange communications 1550 between equipment 1200 that meet or get close to each other at the underground location 10. Again, as it was shown in FIG. 3C and FIG. 3B respectively, data exchange communications 1550 occur, thereby synchronizing the content of data packets 1501 recorded in each telemetry interface device 104. This data exchange communications 1550 is enriched with the sending of the receipt signal 1551. Upon receiving the receipt signal 1551, the equipment 1200 is informed that data packets 1501 which were transmitted earlier were actually received.

The data packets 1501 that were previously synchronized via the data exchange communications 1550 were preferably kept in the records of the telemetry interface devices 104, since no telemetry interface device 104 has the information that they were received at the remote processing center. However, after having received the receipt signal 1551, the telemetry interface device 104 is free to perform any operation on the data packets 1501 identified by the receipt signal 1551 as having been received.

According to an embodiment, upon receiving the receipt signal 1551, the telemetry interface device 104 of the equipment 1200 deletes the data packets 1501 (corresponding to those identified in the receipt signal 1551) recorded on its memory device 106. This deletion enables a sustainable management of the available memory on the memory device 106, since data packets 1501 accumulate with time.

According to another embodiment, the data packets are not deleted. This embodiment is possible if the memory device 106 has a very large memory that does not require data to be erased during operation.

Each time two pieces of equipment 1200 get close to each other synchronization keeps taking place and receipt signals 1551, if any, can be sent. Therefore, each telemetry interface device 104 is updated frequently and keeps in its records all the data packets 1501 for which reception was not confirmed. This frequent update ensures reliability of the system.

Furthermore, it will be noted that no infrastructure needs to be installed at the underground location. It avoids the high cost involved with installing a network in a mine, which is a temporary structure, and the potential damage to the network infrastructure by the equipment circulating in the mine.

Although the system 1000 was described above with three telemetry interface devices 104, it will be understood that a higher number of telemetry interface devices 104, for use with a vehicle fleet, can be provided. More specifically, at least two telemetry interface devices 104 need to be provided.

For the purpose of clarity, there will be defined a first interface device 104a and a second interface device 104b, each one being installed on different pieces of equipment 1200. Each one of the first interface device 104a and of the second interface device 104b comprises the parts of the telemetry interface device 104 described above. There can also be defined a third interface device (which can itself be defined as comprising at least one interface device) which act as an intermediary or intermediaries between the first interface device 104a and the second interface device 104b.

Figure 4:
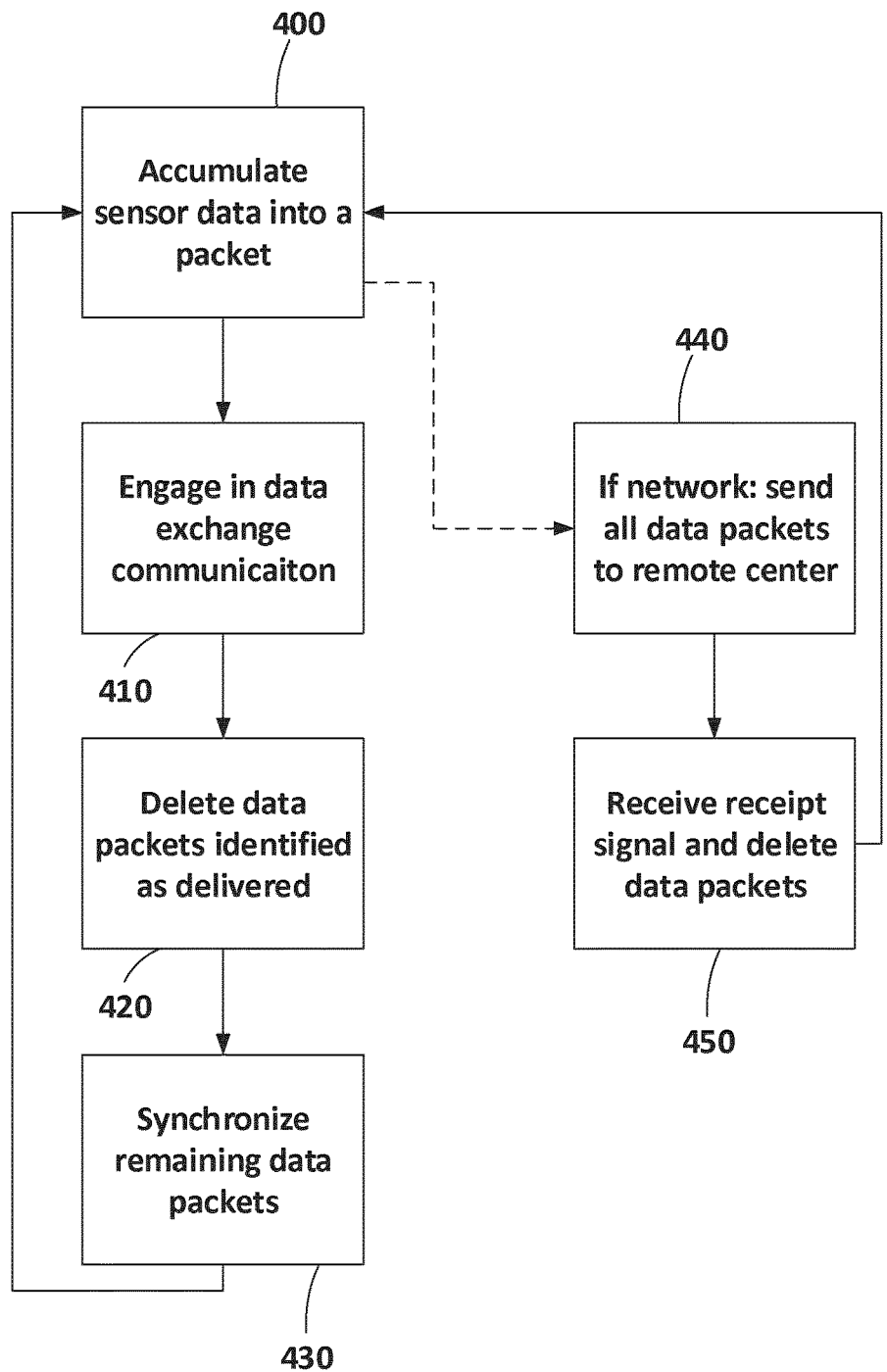
FIG. 4 is a flowchart illustrating a system for transmitting data originating from a network-inaccessible location, according to an embodiment.

Now referring to FIG. 4, there is illustrated a flowchart detailing a method for transmitting the data to outside the underground location:

Step 400 comprises accumulating data from sensing devices 115 in a memory device 106a and 106b of the first interface device 104a and of the second interface device 104b, respectively.

Step 410 comprises establishing a data exchange communication between the first interface device 104a and the second interface device 104b.

Step 420 comprises comparing the most recent receipt signals 1551 received by the first interface device 104a and the second interface device 104b. If one of the first interface device 104a and of the second interface device 104b comprises data packets 1501 identified as having been delivered, these data packets 1501 are deleted (or, if not deleted, they are not considered anymore for future operations).

Step 430 comprises synchronizing data packets 1501 in order to have all non-delivered data packets 1501 recorded on each one of the first interface device 104a and of the second interface device 104b. This step may involve one or more intermediaries (i.e., a third interface device or devices transmitting data in a chain), where each local communication between an interface device and the next one is performed as the one described between the first interface device 104a and the second interface device 104b.

Step 440: At any time during the cycle, if one of the first interface device 104a and the second interface device 104b is in communication with the communication network 1700, it delivers to the remote processing center its data packets 1501 as in step 430.

Step 450: In return, the first or second interface device (104a or 104b) receives a receipt signal 1551 and deletes its own data packets identified therein, as in step 420. The data packets identified in the receipt signal 1551 are therefore excluded from any future synchronization since they belong to the exclusion list defined in the receipt signal 1551.

The method described in relation with a first and a second interface device (104a, 104b) would also apply to a greater number of telemetry interface devices 104.

Thereafter, each one of the first interface device 104a and the second interface device 104b has the same information as the other one. Data 1500 is communicated as frequently as one of them goes outside to a network-accessible location, and a data packet 1501 is deleted from a device only when it has received information (e.g., in the receipt signal 1551) that the given data packet 1501 was delivered successfully.

According to another embodiment, telemetry interface devices 104 are identified according to a hierarchy, and the data exchange communication 1550 rather comprises a unidirectional synchronization of data packets 1501 (instead of a bidirectional one as with all embodiments described above). The telemetry interface device 104 of the most remote equipment 1200 knows that it belongs to equipment 1200 that will not meet any other equipment 1200 and will never go to the surface location 15 (i.e., it is at the bottom of the hierarchy). Therefore, this telemetry interface device 104 will send its own data packets 1501 to its neighbor but will not receive any data packet from a device belonging to a higher step in the hierarchy. Conversely, the surface-returning equipment 1201 is at the top of the hierarchy. It does not need to send its data packets 1501 to devices belonging to lower steps in the hierarchy, but will gather the data packets 1501 originating therefrom. The surface-returning equipment 1201 will send its data packets 1501 only to the remote processing center 102. Therefore, according to this embodiment, data packets 1501 are sent upwardly in the hierarchy (or side-to-side if two vehicles are in the same category) and receipt signals 1551 are sent downwardly in the hierarchy (or side-to-side if two vehicles are in the same category). This embodiment requires that telemetry interface devices 104 have an identifier that identifies the category or position in the hierarchy of a vehicle.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A system for sending, via a communication network, data originating from a monitoring of equipment in a network-inaccessible location, the system comprising:
    a first interface device for monitoring a first equipment and generating data packets from the monitoring;
    a second interface device for monitoring a second equipment and generating data packets from the monitoring,
    at least one other interface device adapted for mutual communication with both the first interface device and the second interface device and adapted for synchronizing the data packets of the first interface device with the data packets of the second interface device,
    wherein:
    the first interface device and the second interface device are adapted for mutual communication through which the data packets from the first interface device and the data packets from the second interface device synchronize;
    at least one of the first interface device and the second interface device is adapted:
        to be displaced to a network-accessible location;
        to deliver, via the communication network, the data packets;
        to receive, via the communication network, a receipt signal indicating the data packets that were delivered;
    the one of the first interface device and the second interface device which received the receipt signal is adapted to communicate the receipt signal to the other one of the first interface device and the second interface device; and
    upon receiving the receipt signal from one of the first interface device and the second interface device, any interface device synchronizes its data packets with the one of the one of the first interface device and the second interface device except for the data packets identified in the receipt signal.

2. A method for transmitting data originating from a network-inaccessible location to a processing center, the method comprising:

monitoring equipment by a first interface device in a network-inaccessible location;
generating an identifiable data packet from the monitoring;
recording the identifiable data packet on the first interface device;
providing a local communication between the first interface device and a second interface device, the second interface having at least another identifiable data packet recorded thereon;
upon providing the local communication between the first interface device and the second interface device, sending a receipt signal from the second interface device to the first interface device;
upon providing the local communication between the first interface device and the second interface device, sending the other identifiable data packet from the second interface device to the first interface device for recording thereon, thereby synchronizing the identifiable data packets recorded on the first interface device and excluding from the synchronizing the identifiable data packets which are identified in the receipt signal as received by at least one of the first interface device and the second interface device;
sending the identifiable data packet from the first interface device to the second interface device for recording thereon;
displacing the second interface device to a network-accessible location for sending the identifiable data packet to a processing center;
upon sending the identifiable data packet to a processing center, receiving a receipt signal of any identifiable data packet received by the processing center.

3. The method of claim 2, wherein providing a local communication between the first interface device and second interface device comprises:
providing a local communication between the first interface device and a third interface device;
sending the identifiable data packet from the first interface device to the third interface device;
providing a local communication between the third interface device and the second interface device; and
sending the identifiable data packet from the third interface device to the second interface device.

4. The method of claim 3, wherein the third interface device comprises one or more interface devices, wherein if the third interface device comprises two or more interface devices, a local communication is provided at least temporarily between two of them.

5. The method of claim 4, wherein upon providing the local communication between the first interface device and the third interface device, the third interface device sends any identifiable data packet recorded thereon to the first interface device; and
wherein upon providing the local communication between the third interface device and the second interface device, the second interface device sends any identifiable data packet recorded thereon to the third interface device.

* * * * *